United States Patent
Frank (10) Patent No.: US 12,008,735 B2
(45) Date of Patent: Jun. 11, 2024

(54) DUAL ENERGY DETECTOR AND METHOD FOR IMPROVING IMAGE DATA GENERATED THEREBY

(71) Applicant: SMITHS HEIMANN GMBH, Wiesbaden (DE)

(72) Inventor: Alexander Frank, Wiesbaden (DE)

(73) Assignee: SMITHS DETECTION GERMANY GMBH, Wiesbaden (DE)

( * ) Notice: Subject to any disclaimer, the term of this patent is extended or adjusted under 35 U.S.C. 154(b) by 396 days.

(21) Appl. No.: 17/415,968

(22) PCT Filed: Dec. 20, 2019

(86) PCT No.: PCT/EP2019/086706
§ 371 (c)(1),
(2) Date: Jul. 15, 2021

(87) PCT Pub. No.: WO2020/127989
PCT Pub. Date: Jun. 25, 2020

(65) Prior Publication Data
US 2022/0222793 A1    Jul. 14, 2022

(30) Foreign Application Priority Data
Dec. 21, 2018 (DE) .......................... 102018133525.3

(51) Int. Cl.
*G06T 3/00*    (2006.01)
*G06T 3/10*    (2024.01)
*G06T 5/50*    (2006.01)

(52) U.S. Cl.
CPC .................. *G06T 5/50* (2013.01); *G06T 3/10* (2024.01); *G06T 2207/10116* (2013.01); *G06T 2207/20216* (2013.01); *G06T 2207/20228* (2013.01)

(58) Field of Classification Search
CPC .......... G06T 5/50; G06T 3/0056; G06T 3/00; G06T 2207/20216; G06T 2207/20228; G06T 2207/10116
See application file for complete search history.

(56) References Cited

U.S. PATENT DOCUMENTS 5,841,832 A * 11/1998 Mazess ..................... G06T 7/60
250/367
5,841,833 A     11/1998 Mazess et al.
(Continued)

FOREIGN PATENT DOCUMENTS

| DE | 102011053971 A1 | 3/2013 |
| EP | 1010021 B1 | 10/2004 |
| EP | 2960686 A1 | 12/2015 |

OTHER PUBLICATIONS

International Search Report with partial English translation for PCT application No. PCT/EP2019/086706, dated Mar. 30, 2020, 6 pages.

*Primary Examiner* — Tuan H Nguyen
(74) *Attorney, Agent, or Firm* — Armstrong Teasdale LLP (57) ABSTRACT

A dual-energy X-ray detector includes a detector line arranged transversely to the sampling direction, including first and second detector elements which respond differently to an X-ray spectrum and which are each arranged alternately next to one another in the detector line, the first and second detector elements each producing based on X-ray radiation (XR) independently of one another in each case only corresponding first or second detector data.

11 Claims, 7 Drawing Sheets

(56) References Cited

U.S. PATENT DOCUMENTS

| | | | |
|---|---|---|---|
| 7,970,096 B2 * | 6/2011 | Pavlovich | A61B 6/4028 378/19 |
| 9,885,801 B2 | 2/2018 | Chen et al. | |
| 2010/0172464 A1 | 7/2010 | Pavlovich et al. | |
| 2014/0198899 A1 | 7/2014 | Ziskin et al. | |

* cited by examiner

DUAL ENERGY DETECTOR AND METHOD FOR IMPROVING IMAGE DATA GENERATED THEREBY

CROSS REFERENCE TO RELATED APPLICATIONS

This patent application is a National Stage Entry of PCT/EP2019/086706 filed on Dec. 20, 2019, which claims the benefit and priority of German Patent Application No. 102018133525.3 filed on Dec. 21, 2018, the disclosures of which are incorporated by reference herein in their entirety as part of the present application.

BACKGROUND

The present disclosure relates generally to the non-destructive inspection of objects by means of X-ray inspection with dual-energy detection for finding target items. More particularly, the present disclosure relates to measures for reducing the system cost of a corresponding X-ray inspection apparatus by means of a simplified dual-energy detector and measures for improving the detector data provided by said dual-energy detector.

The following introductory description is intended solely for a better understanding of the technical relationships described here and is not to be understood in any way as admitted prior art, unless it is expressly marked as such.

Discrimination of materials using dual-energy techniques is well known in principle; see, for example, S. Kolkoori et al, "Dual High-Energy X-ray Digital Radiography for Material Discrimination in Cargo Containers", 11th European Conference on Non-Destructive Testing, 2014, Prague, Proceedings. The dual energy technique is based on the fact that the energy dependence of the attenuation coefficient of a material is a property of the material. Therefore, energy-resolved (in the sense of spectrally selective) measurements can be used to collect detector data needed for a quantitative calculation of material properties. In practice, these energy-resolved measurements can be obtained by taking two X-ray images with different X-ray spectra. The use of a so-called dual-energy detector is established, whose special design essentially provides two energy channels and thus the required high-energy (Hi) detector data and low-energy (Lo) detector data can be obtained with one measurement.

EP 1 010 021 B1 discloses a dual energy X-ray radiation detector. The detector includes an Lo detector line having first Lo-detector elements responsive to X-ray radiation in a first low energy range to provide a first radiation sensitivity, and a Hi-detector line having second Hi-detector elements responsive to radiation of a second high energy range to provide a second radiation sensitivity. The Lo-detector line and the Hi-detector line are both arranged one behind the other transversely to the sampling direction of an object in such a way that the first detector elements and the second detector elements can receive the X-ray radiation to be measured independently of each other.

Figure 1:
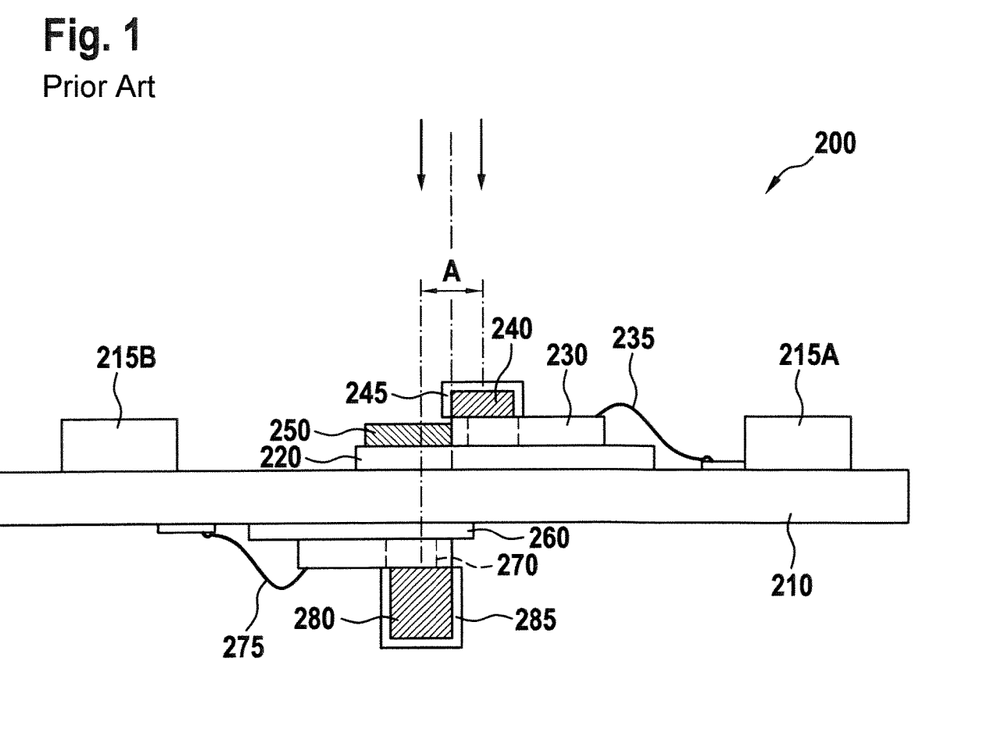
FIG. 1 shows a cross-sectional view of a prior art detector with a line of first detector elements and a line of second detector elements, the lines being arranged one behind the other in the sampling direction.

FIG. 1 shows a cross-sectional view of an implementation of a detector 200 known from EP 1 010 021 B1. X-rays are symbolically shown entering from top to bottom. The detector 200 includes a circuit board 210, two interfaces 215A and 215B, an Lo-ground 220, an Lo-photodetector line 230 with Lo-photodiodes, an Lo-wiring 235, an Lo-crystal 240 as scintillator, an Lo-coating 245, a filter 250, an Hi-ground 260, an Hi-photodetector line 270 with Hi-photodiodes, an Hi-wiring 275, an Hi-crystal 280 as scintillator, and an Hi-coating 285. Thus, the circuit board 210 carries two detector lines 230 and 270 and interfaces 215A and 215B.

The Lo-ground 220, made of gold-plated copper, connects a common cathode of the photodiodes of Lo-photodetector line 230 as a common ground. The Lo-photodetector line 230 responds to Lo-X-rays by having Lo-crystal 240 as a scintillator convert Lo-range X-ray photons into visible light photons that can be detected by the photodiodes. The Lo-photodiodes detect the light that is generated in the respective detector element according to the intensity profile of the Lo-crystal 240 as a scintillator and generate a corresponding analog signal therefrom. The analog signal from each photodiode is fed to the data processing board (not shown) via interface 215A. The Lo-wiring 235 connects the outputs of each photodiode to the corresponding terminals of Lo-interface 215A.

The filter 250, made of a material with a high atomic number, such as silver, gold, or copper, enhances the ability of the detector array to detect Hi-radiation. The Hi-ground 260, made of gold-plated copper, acts as a common ground connecting the cathodes of the photodiodes of the Hi-photodetector line 270. Each of the photodiodes responds to Hi-X-rays and, similar to what is explained for the Lo-photodetector line, converts light generated according to the intensity profile of the scintillator material corresponding to the detected Hi-radiation into an analog signal. The analog signal from each photodiode is then routed to the data processing board via interface 215B.

The number of photodiodes, the distance between them, and the dimensions of the photodiodes in each of the photodetector lines define the resolution of the sampling in the corresponding sampling line; these parameters are the same for Hi-photodiode line 270 and Lo-photodiode line 230.

In use, for an inspection object the known dual-energy detector can be used to acquire the two measured detector data per pixel required for material discrimination in parallel, line by line, for all pixels. However, the Hi-detector data and the Lo-detector data are not acquired simultaneously when a specific object line is observed, but successively, i.e. at different times, in that the specific object line is first sampled by the Lo-detector line and then, after the object has been moved on by one detector line width, the specific object line is sampled by the Hi-detector line (or vice versa, depending on the arrangement of the two detector lines in the transport direction of the object).

BRIEF DESCRIPTION

The inventor has recognized that the detector described at the outset, with a Hi-detector line and a Lo-detector line arranged one behind the other in the sampling direction, which is already simplified in the structure of the entire detector unit compared with detectors in which a Hi-detector element and a Lo-detector element are each arranged one above the other in a line, can nevertheless be simplified further.

The present disclose describes a detector line in which Hi-detector elements and Lo-detector elements are arranged alternately next to each other in one and the same line. In principle, an inspection object can be sampled with a desired resolution using the detector line proposed here with the detector elements arranged next to each other in a direction transverse to the sampling direction. However, for each detector location, i.e., pixel, only either Hi-detector data or Lo-detector data can be measured. The respective detector data not acquired at the location of a detector element can be calculated by means of interpolation, so that the dual-energy information required for material discrimination is available.

Thus, a first aspect provides a dual-energy (X-ray) detector for use in a dual-energy X-ray method. The dual-energy detector includes a detector line to be arranged transverse to a sampling direction formed of first detector elements and second detector elements responding differently to an X-ray spectrum, each detector element being arranged alternately side-by-side in the detector line. The first and second detector elements detect X-ray radiation independently of each other and each generate only first detector data or second detector data. That is, due to the respective preset sensitivity for X-rays of the X-ray spectrum, the first and second detector elements each selectively detect only corresponding first detector data of the X-ray spectrum or second detector data of the X-ray spectrum.

For example, the first detector elements can be Lo-detector elements and the second detector elements can be Hi-detector elements. That is, the first detector elements respond to X-rays of a Lo-range of the X-ray spectrum and the second detector elements respond to X-rays of a Hi-range of the X-ray spectrum. The second detector elements may also be designed to respond to X-rays of a wider range of the total X-ray spectrum, but at least of the Hi-range of the X-ray spectrum.

The first detector data of the X-ray spectrum of the first detector elements mainly provide material information as to how well a x-rayed material allowed low energy X-rays to pass through. The second detector data of the X-ray spectrum of the second detector elements mainly provide material information as to how well a x-rayed material allowed high energy X-rays to pass through.

When X-rays containing at least X-rays in the Lo-range and in the Hi-range of the detector elements are transmitted through an inspection object, associated X-ray intensities are recorded as detector data for each detector element with the detector arrangement.

The detector data provided by the dual-energy detector can basically be an analog or digital detector signal.

The X-ray spectrum is basically determined by the X-ray source used (X-ray generator) in a manner known per se. That is, the term X-ray spectrum here refers to the spectrum of the X-rays emitted by the X-ray source.

An inspection object can be sampled line-by-line by means of the transverse sampling direction, which usually corresponds to a transport direction of the inspection object through an inspection apparatus with respect to the detector line arranged in the inspection apparatus, and thus a plurality of first and second detector data can be acquired line-by-line. As a result, for each pixel of a x-ray image to be derived from the acquired detector data, either only first or only second detector data are acquired. That is, for each pixel initially only one type of the two types of detector data required for a dual-energy technique is available, namely Lo-detector data and Hi-detector data.

For example, the first detector elements and second detector elements may each include photodiodes with a scintillator material selected and sized to adjust the predetermined sensitivity to X-rays of the X-ray spectrum.

The first detector elements and the second detector elements may be arranged on the same side of a substrate, e.g., in the form of a printed circuit board, of the detector arrangement or on different sides substrate of the detector arrangement.

As mentioned above, the measured detector data of each detector element initially correspond to one image pixel of an X-ray image to be derived from the detector data. Therefore, for each image pixel the missing, i.e., not measured, detector data are calculated by means of interpolation.

For image display based on the detector data, each pixel is colored according to the result of the material discrimination based on the per se known dual-energy technique.

The brightness (luminance) of each pixel can be derived from the Hi-detector data. Thus, as a result, a colored x-ray image, for example a 3-color representation, can be provided for the color representation of the items in the x-ray image according to material classes. In the color representation according to material classes, the items contained in the inspection object are colored depending on the material of which they are predominantly made, so that an optical assignment to predetermined material classes is immediately recognizable for an observer in the colored X-ray image. For example, metallic objects or organic materials can each be highlighted by means of different coloring and can be distinguished from one another more easily.

A second aspect provides an X-ray inspection apparatus including a dual energy (X-ray) detector according to the first aspect. The X-ray inspection apparatus is at least arranged for transporting, in a sampling direction, inspection objects through the X-ray inspection apparatus for performing an imaging inspection method for non-destructively inspecting the inspection objects and for providing detector data describing the inspection objects based on detection of X-rays running through the inspection objects by means of the dual-energy detector according to the first aspect.

The inventor has found that colorized x-ray images, produced based on detector data acquired with the dual-energy detector according to the first aspect, include the following image errors.

(a) Especially at edges of items, false colors (false color information) appear in the colorization by material class derived from the detector data.

(b) In the case of small structures where the absorption of the X-ray beams alternates between high and low values, false colors occur in the coloring derived from the detector data according to material classes in such a way that a structure is represented in the image which does not correspond to the structure actually present in the inspection object. An example of such a misrepresented structure are integrated components with a BGA package, where spherical connections are arranged in a grid on a mounting side for SMD mounting on a board (BGA is derived from the term Ball Grid Array).

(c) In areas of an inspection object where a homogeneous material is present, false alternating light-dark structures (luminance fluctuations) occur in the coloration by material class derived from the detector data.

(d) In the colorization by material class derived from the detector data, erroneous colors are observed, which the inventor suspects are caused by different absorption properties of edge pixels of the dual-energy X-ray detector.

The following description proposes one or more possibilities, applicable individually or in combination, by which the aforementioned errors in the color representation according to material classes, derived from the detector data detected by means of the dual-energy detector according to the first aspect, can at least be reduced or eliminated.

It should be noted that features and details defined in connection with the detector data correction method of the second aspect naturally apply correspondingly to a processing device of the third aspect, and correspondingly to a system including the X-ray inspection apparatus of the second aspect and the processing device of the third aspect, and vice versa in each case. Therefore, to avoid repetition, reference is made herein to each other with respect to the individual aspects.

Several technical findings and considerations were required to find the technical solution proposed here. In particular, it was recognized that the observed image errors are related to the particularities of the systematic juxtaposition of Hi-detector elements and Lo-detector elements in the detector line, as explained below. Therefore, the measures proposed herein are basically based on the following findings and technical considerations of the inventor for the X-ray inspection apparatus of the second aspect with a detector of the first aspect.

(a) The inventor has recognized that the X-rays detected by two adjacent detector elements at different spherical angles lead to false color information in the derived X-ray image, especially at edges in the inspection object.
  (b) The inventor has recognized that for small structures in the inspection object, where the absorption of the X-rays alternates between high and low values, erroneous color information occurs because either only one Lo-detector element or only one Hi-detector element detects the small structure and thus, overall, an incorrect structure is inferred due to the interpolation. For example, integrated devices with the above-mentioned BGA package have proven to be problematic, since it can happen that either the Lo-detector elements or the Hi-detector elements always detect a spherical connection and the other detector elements do not, resulting in the aforementioned image error.
  (c) The inventor has recognized that in the case of homogeneous materials in an inspection object, the different absorption characteristics of the Lo-detector elements and the Hi-detector elements arranged next to each other in the X-ray image derived from the detector signal can lead to an alternating light-dark structure (also brightness or luminance fluctuations).
  (d) The inventor has recognized that when the Lo-detector elements and the Hi-detector elements are arranged in photo diode lines (English Photo Diode Array, PDA), direct crosstalk can occur between the different channels. Since at the edge of the photo diode array (i.e., at the edge of the detector line) either a Lo-detector element or Hi-detector element has only one immediately adjacent detector element, the result is that the absorption characteristics of the detector elements located at the two edges of the detector line are different. This also appears to lead to incorrect coloring of associated pixels in the X-ray image derived from the detector signal.

A solution was therefore sought to reduce the image distortions discussed above or to correct them in such a way that the X-ray image displayed to an operator, colored according to material classes, can be readily evaluated.

Thus, a third aspect relates to a method for correcting detector data of an X-ray inspection apparatus (according to the second aspect) including a dual-energy X-ray detector according to the first aspect.

The following image enhancement measures are prefaced by saying the following:

The color of a pixel in the colorized x-ray image to be derived from the detector data is derived based on material discrimination by determining the Z-eff using the high energy (Hi-) detector data and low energy (Lo-) detector data for a pixel.

The brightness (luminance) of an image pixel is determined based on one type of detector data, optionally the Hi-detector data, but Lo-detector data can also be used.

The following measures can be used on their own to remedy a particular distortion, but they can also all be used together. In principle, all the measures proposed here can be applied simultaneously or individually. Each of the image enhancing measures has been identified as self-adjusting, since each measure "quasi" has a significant effect only at its destination of the image and does not lead to any significant change (distortion) at other locations.

It is proposed here to correct the detector data provided by an inspection apparatus according to the second aspect with a method, the method including the following steps:

With a first step (a1) of the method, missing second detector data for the location of a first detector element are derived. For this purpose, first an interpolation value is determined from measured second detector data of second detector elements adjacent to this first detector element. Then, a correction value is determined based on first detector data measured with this first detector element and adjacent measured first detector data. Eventually, the first determined interpolation value is corrected with this correction value.

Determining the correction value in step (a1) may include taking the difference of n times the detector data measured with the first detector element and the sum of n first detector data measured adjacent in the detector line, where n is an integer, even number with n>=2.

Alternatively or additionally, missing first detector data for the location of a second detector element are derived with a second step (a2) of the method. For this purpose, first an interpolation value is determined from measured first detector data of first detector elements adjacent to this second detector element. Then, a correction value is determined based on second detector data measured with this second detector element and adjacent measured second detector data. Eventually, the first determined interpolation value is corrected with the correction value.

Determining the correction value in step (a2) may include taking the difference of n times the detector data measured with the second detector element and the sum of n second detector data measured adjacent in the detector line, where n is an integer, even number with n>=2.

The above measure is a modified interpolation for the determination of the missing detector data at a detector location, which leads to an improved quality of the material discrimination. With this measure, image distortions due to false colors at edges in the inspection object and false colors in areas with fine structures of an inspection object, which can occur due to the special structure of the dual-energy detector of the first aspect, are avoided. In particular, this measure has been found to result in no significant changes for a homogeneous material. In areas with high-frequency structural changes, false colors due to mis-sampling with the first or second detector elements are avoided or at least reduced.

The correction value can be a correction factor, for example. Correcting the interpolation value with the correction value can then be performed as multiplying the interpolation value with the correction factor.

Determining the correction factor in step (a1) may include forming the difference of 1 and a quotient of a difference of the two second detector data measured adjacent to each other on the left side and right side in the detector line and the sum of the two second detector data measured adjacent to each other on the left side and right side in the detector line. Accordingly, determining the correction factor in step (a2) may include taking the difference of 1 and a quotient of a difference of the two first detector data measured in the detector line adjacent to the left side and adjacent to the right side and the sum of the two first detector data measured in the detector line adjacent to the left side and adjacent to the right side.

Another measure, which can be applied on its own or in combination with one of the preceding measures, aims to correct brightness or light-dark variations. For the determination of the brightness (luminance) of the pixels of the final transillumination image, normally only one type of detector data is used uniformly for all pixels, i.e., either only the Hi-detector data or only the Lo-detector data. Since in the simplified detector line of the first aspect for every second pixel the thus required detector data for the determination of the brightness of the pixel are missing as measured data, half of the brightness information of all pixels is initially based on interpolated detector data (i.e., detector data determined by calculation in comparison to measured detector data).

The following further measure intends to improve the brightness value assigned based on (by calculation) determined detector data of an pixel. For this purpose, the following steps are proposed:

(b1) Determination of material values for all pixels based on the detector data actually measured for each pixel and the detector data determined for each pixel (by calculation). The material values assigned to the pixel define a material information matrix by storing a Z-effective value as material value in the material information matrix for each pixel corresponding to a detector element.

(b2) Filtering of the material values determined for all pixels in the material information matrix by means of a mean-based or median-based filter operation, which detects N×N material values around each pixel, where N is an integer greater than 3, for example N=5. "Mean-based" or "median-based" should mean here that the result can be additionally weighted with a factor or adjusted with an offset.

(b3) Determining, at each pixel at which first detector data has been measured, based on the material value determined for that pixel, theoretical second detector data associated with that pixel. "Theoretical detector data" means here that in the dual-energy technique, given a known Z-eff of a x-rayed material and knowledge of one type of detector data, namely the Hi-detector data or the Lo-detector data, the respective unknown detector data can be theoretically determined.

(b4) Determining for all pixels a respective brightness value based on the measured second detector data or the theoretical second detector data available for the respective pixel.

The second detector data may be Hi-detector data. With this measure, luminance distortions, in particular luminance fluctuations, can be corrected. That is, by means of the previous measures (discussed above), the material discrimination on which the coloring of the final x-ray image is based can be improved. The inventor has recognized that the material values determined in this way, as described above, can be used to determine theoretical Hi-detector data, which then determine the luminance of the pixel in question.

As already mentioned, this measure for luminance correction can in principle also be used based on Lo-detector data as second detector data. Since the interpolated detector data and the measured detector data for a known material value for a pixel are related by a factor, Lo-detector data can also be used for the luminance correction, which may be based on Hi-detector data.

The above measure can be used in particular to avoid light-dark fluctuations in those image areas in which the inspection object actually has a homogeneous material and should therefore be uniformly bright in the x-ray image.

A fourth aspect relates to a processing device for correcting detector data, the processing device including a computer unit arranged to perform a method according to the third aspect.

A fifth aspect relates to a system including the X-ray inspection apparatus of the second aspect, which is arranged to forward the acquired detector data to a processing device according to the fourth aspect. For this purpose, the X-ray inspection apparatus may be connected to the processing device for data communication, for example wired or wireless.

A sixth aspect relates to a computer program product including a computer program having software means for performing a method according to the third aspect when the computer program is executed on a computer, in particular on a processing device according to the fourth aspect.

A seventh aspect relates to a data carrier including a computer program product according to the third aspect.

An eighth aspect relates to a data stream including electronically readable control signals that can interact with a programmable computer, in particular a processing device according to the fourth aspect, such that when the computer executes the electronically readable control signals, the computer performs a method according to the third aspect.

BRIEF DESCRIPTION OF THE DRAWING

Further advantages, features and details of the solution(s) proposed herein result from the following description, in which embodiments are described in detail with reference to drawings. In this context, the features mentioned in the claims and in the description may each be essential individually or in any combination. Likewise, the features mentioned above and those further described herein may be used individually or in any combination. Functionally similar or identical parts or components are partly provided with the same reference signs. The terms "left", "right", "top" and "bottom" used in the description of the embodiments refer to the drawings in an orientation with normally readable figure designation or normally readable reference signs. The embodiments shown and described are not to be understood as conclusive but have an exemplary character for explaining the solution proposed here. The detailed description is for the information of the person skilled in the art, therefore known structures and methods are not shown or explained in detail in the description in order not to complicate the understanding of the description.

DETAILED DESCRIPTION

FIG. 1 shows a cross-sectional view of the prior art dual energy detector 200 discussed in the introduction, which is known from EP 1 010 021 B1.

Figure 2:
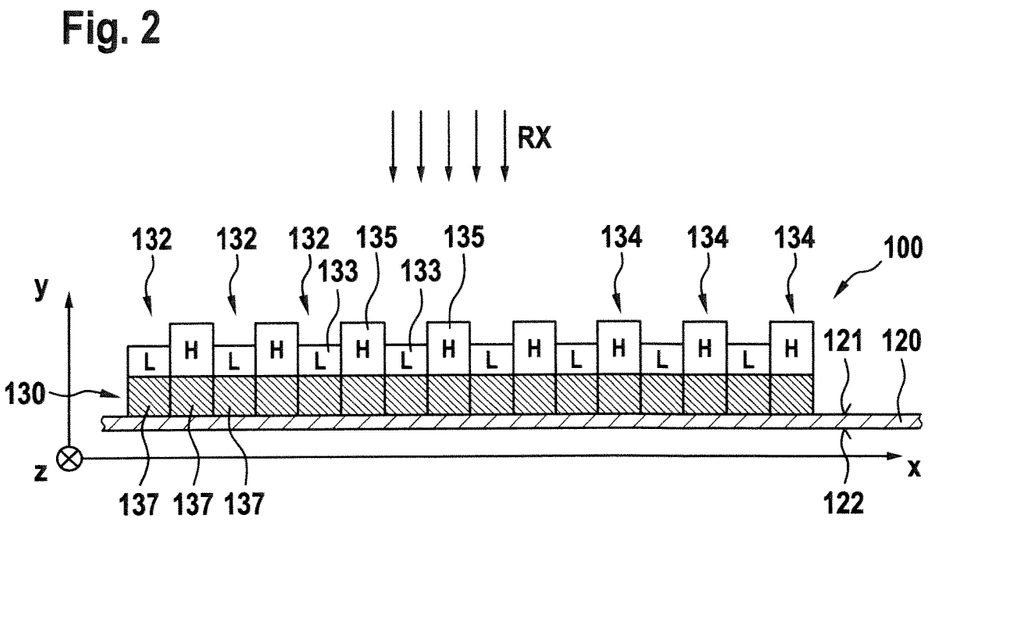
FIG. 2 shows a cross-section through a novel detector line, where Lo-detector elements and Hi-detector elements are alternately arranged next to each other in the detector line.

FIG. 2 shows a highly simplified cross-sectional view of a detector line 130 of a dual-energy X-ray detector 100 proposed herein, according to an embodiment. In the detector line 130, low-energy (Lo-) detector elements 132 and high-energy (Hi-) detector elements 134 are arranged alternately next to each other.

The detector array 130 consists basically of a photo diode line (photo diode array, PDA) with photodiodes 137 arranged on a carrier board 120 as a substrate. The photodiodes 137 are each alternately provided with an associated scintillator 133 or 135 in the detector array 130.

By using special materials in the scintillators 133, 135 and/or dimensioning the layer thickness (in the y-direction) of the respective scintillators 133, 135, the response of the respective photodiode 137 implements a Lo-detector element 132 or a Hi-detector element 134.

For example, in one implementation, the dimension of a detector element may be 0.8 mm (in the z-direction) by 0.8 mm (in the line direction, i.e., x-direction). A typical detector line may be 80 mm in total in the line direction (x-direction), so that the line consists of approximately 1,000 detector elements. In principle, the dimensions of the detector elements and the length of the detector line are freely selectable.

For example, as shown simplified (and therefore exaggerated, i.e., not to scale) in FIG. 2, the Lo-detector elements 132 have a scintillator 133 made of a special scintillator material L with a first layer thickness (which is determined in the direction of incidence for the X-rays, i.e., in the y-direction). The Hi-detector elements 134 have a scintillator 135 made of another special scintillator material H with a second layer thickness. As shown in FIG. 2, the first layer thickness is smaller than the second layer thickness.

It should be noted that the scintillator materials L and H can in principle also be the same, in which case the response behavior is determined exclusively by the layer thickness. It is also possible that the layer thicknesses of the Hi- and Lo-detector elements 132, 134 are the same, in which case the response behavior is determined exclusively by the differently selected scintillator materials L and H.

For example, YAG (yttrium aluminum garnet), YGAG (yttrium gadolinium aluminum garnet), GOS (gadolinium oxysulfide) or materials physically similar to X-rays can be used as the scintillator material.

For the Lo-scintillator, first layer thicknesses on the order of less than 1 mm (e.g., 0.45 mm) may be used, and for the Hi-scintillator, second layer thicknesses on the order of greater than 1 mm (e.g., 1.4 mm) may be used.

In the detector line shown in FIG. 2, all detector elements 132, 134 are arranged on the same side, namely the upper side 121 of the carrier board 120. It should be noted that (in a variant not shown) the Lo-detector elements 132 may be arranged on the upper side 121 of the carrier board 120, while the Hi-detector elements 134 are on the lower side 122 of the carrier board 120, or vice versa.

For orientation and reference, a coordinate system is shown in FIG. 2, according to which the longitudinal direction of the detector line 130 runs in the x-direction, the direction of X-rays RX (simplified as an arrow bundle) incident on the detector elements 132, 134 to be detected runs in the y-direction and the sampling direction of the detector line runs in the z-direction. The sampling direction corresponds to the transport direction TR of inspection objects through the X-ray inspection apparatus 1 shown as an example in FIG. 4. Basically, in this context the longitudinal direction (x-direction) of the detector line 130 proposed here is arranged transversely to the sampling direction (z-direction).

Figure 3A:
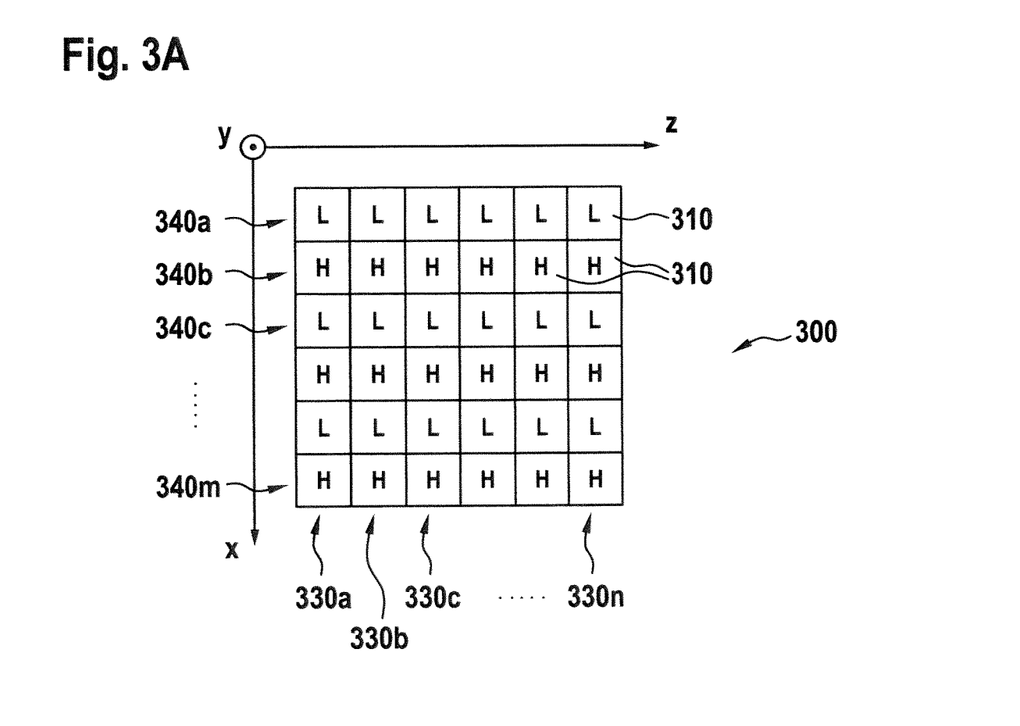
FIG. 3A illustrates the matrix structure of acquired detector data collected by the detector line of FIG. 2 by line-by-line sampling of an inspection object transilluminated with X-rays.

FIG. 3A illustrates a matrix structure of acquired detector data collected by the detector line 130 of FIG. 2 by line-by-line sampling of an inspection object x-rayed with X-rays.

FIG. 3A also shows the coordinate system of FIG. 2 for orientation and reference. Accordingly, the detector line 130 generates the detector data matrix 300 during line-by-line sampling.

The detector data matrix 300 is composed of lines 330a, 330b, 330c, ..., 330n in the z-direction. Due to the alternating arrangement of the Lo- and Hi-detector elements 132, 134, the detector data matrix 300 shows columns 340a, 340b, 340c, ..., 340m, each consisting only of measured Lo-detector data or Hi-detector data. I.e., as already explained, the simplification in the structure of the detector line 130 with respect to one kind of detector element each was "bought" with an under-sampling. However, this under-sampling can be compensated by reconstruction, for example by interpolation, of the type of detector data missing at each pixel.

Figure 3B:
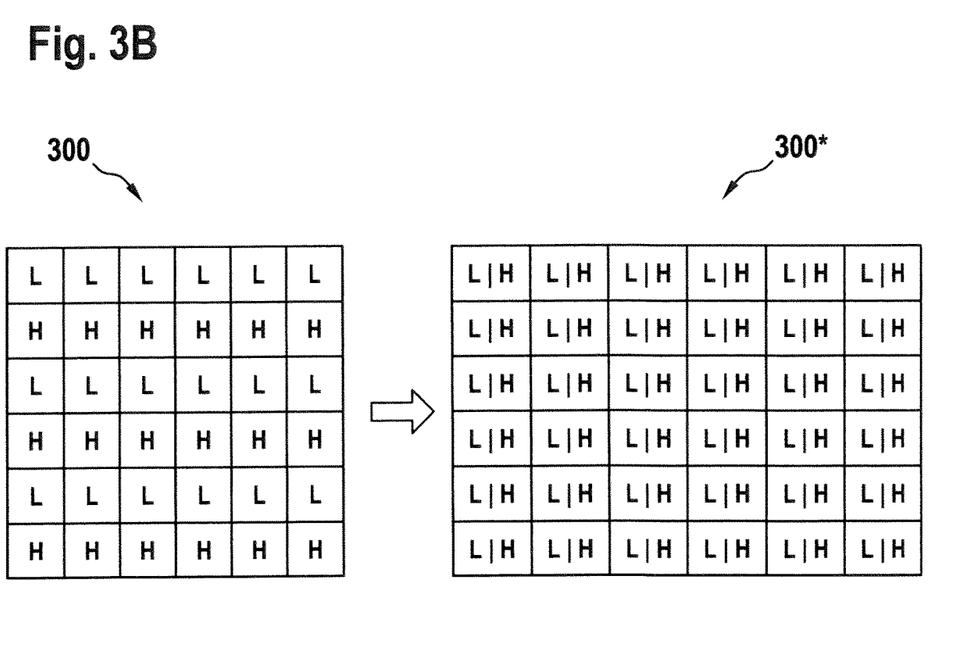
FIG. 3B illustrates that from the acquired detector data of the matrix structure of FIG. 3A, a matrix containing acquired and calculated detector data for each pixel is calculated.

FIG. 3B illustrates that from the acquired detector data matrix of FIG. 3A, a complete detector data matrix is derived, in which for each pixel acquired (measured) and (by calculation) determined detector data are available. For example, the missing type of detector data for a pixel can be calculated by interpolation of the two adjacent measured detector data and thus determined.

Figure 4:
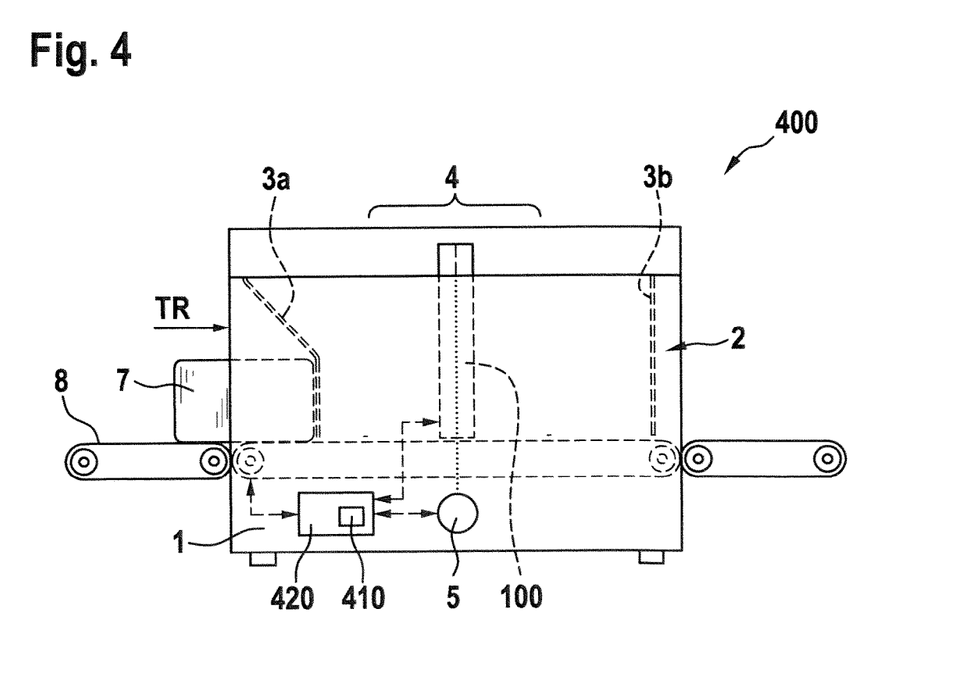
FIG. 4 shows an example of an X-ray inspection system with a detector with a detector line of FIG. 2 in a lateral cross-sectional view.

FIG. 4 shows for illustration an example of an X-ray inspection apparatus 1 with a detector 100 with a detector line 130 of FIG. 2 in a lateral cross-sectional view. The X-ray inspection apparatus 1 has radiation protection curtains 3a, 3b, one of which is arranged at an entrance and one at an exit of a radiation tunnel 2 of the X-ray inspection apparatus 1. Between the radiation protection curtains 3a, 3b there is a radiation area 4 inside the radiation tunnel 2, in which at least one radiation source 5 (e.g., X-ray tube with column limiter) and the detector 100 aligned thereon are arranged. For the transport of a piece of luggage 7 as an inspection object in the transport direction TR through the radiation tunnel 2, a transport device 8, for example a sliding belt conveyor, is used, which conveys the inspection objects 7 in the transport direction TR through the radiation area 4. The detector 100 and thus also the detector line 130 is L-shaped and arranged with the longitudinal direction transverse to the transport direction TR, so that the transport direction TR corresponds to the sampling direction of the inspection objects 7.

FIG. 4 is also a highly simplified block diagram of a system 400 consisting essentially of the X-ray inspection apparatus 1 and a processing unit 410 adapted to perform the procedures proposed herein for correcting detector data generated by an X-ray inspection apparatus, for example the X-ray inspection apparatus 1 of FIG. 4, equipped with a dual-energy detector, for example the dual-energy detector 100 of FIG. 2.

The processing unit 410 may be part of a control device 420 of the X-ray inspection apparatus 1, as illustrated in FIG. 4. The corrected or compensated detector data may be used in the control device 420 or a separate image processing device connected thereto to produce the desired x-ray image colored based on material classes, which is displayed to an operator on a screen (not shown) in a manner known per se. The processing unit 410 can in principle also be located completely separately from the X-ray inspection apparatus, for example at a central location where the raw detector data of several inspection apparatuses are combined and centrally processed. However, this makes no difference to the effectiveness of the corrective measures proposed here.

For example, the processing unit 410 may also be part of the dual-energy detector unit 100 so that the data generated by the detector unit 100 is immediately enhanced at the detector in accordance with the measures proposed herein. Thus, the dual-energy detector unit 100 proposed herein could be made fundamentally compatible with existing X-ray inspection equipment having conventional elaborate detector units. As a result, for X-ray inspection apparatuses that are otherwise of the same design, the dual-energy detector unit 100 proposed herein, in conjunction with the improvement measures for the detector data, can reduce the system costs while maintaining a similarly high image quality.

The discussion of the reconstruction measures of detector data missing at the location of a detector element illustrated in FIGS. 5-9 is preceded by an explanation of the symbols used.

In each of the FIGS. 5-9, the detector line 130 is shown as explained in connection with FIG. 2. For simplicity of illustration, the alternating Lo-detector elements are denoted by L and the Hi-detector elements are denoted by H. In each Figure, the X-ray beams RX incident from an X-ray source are symbolically indicated by an arrow bundle, the X-ray beams RX running from bottom to top in the Figures, passing through a test object or free space in each case and then hitting the detector line 130, whose detector elements 132, 134 each detect Lo-detector data or Hi-detector data for one pixel.

The detector data are represented by means of respective symbols. Hi-detector data are circles and Lo-detector data are triangles. For the respective detector data acquired by a detector element, i.e., detector data actually measured with the respective detector, the symbol is a filled symbol. A reconstructed type of detector data for a particular detector is shown with the corresponding symbol with dashed border. If detector data calculated by interpolation do not correspond correctly to the actual conditions, correspondingly corrected detector data are shown with the corresponding symbol, the area of which is sharpened. In addition, an arrow indicates the direction in which the non-fitting interpolation value should be corrected.

Figure 5:
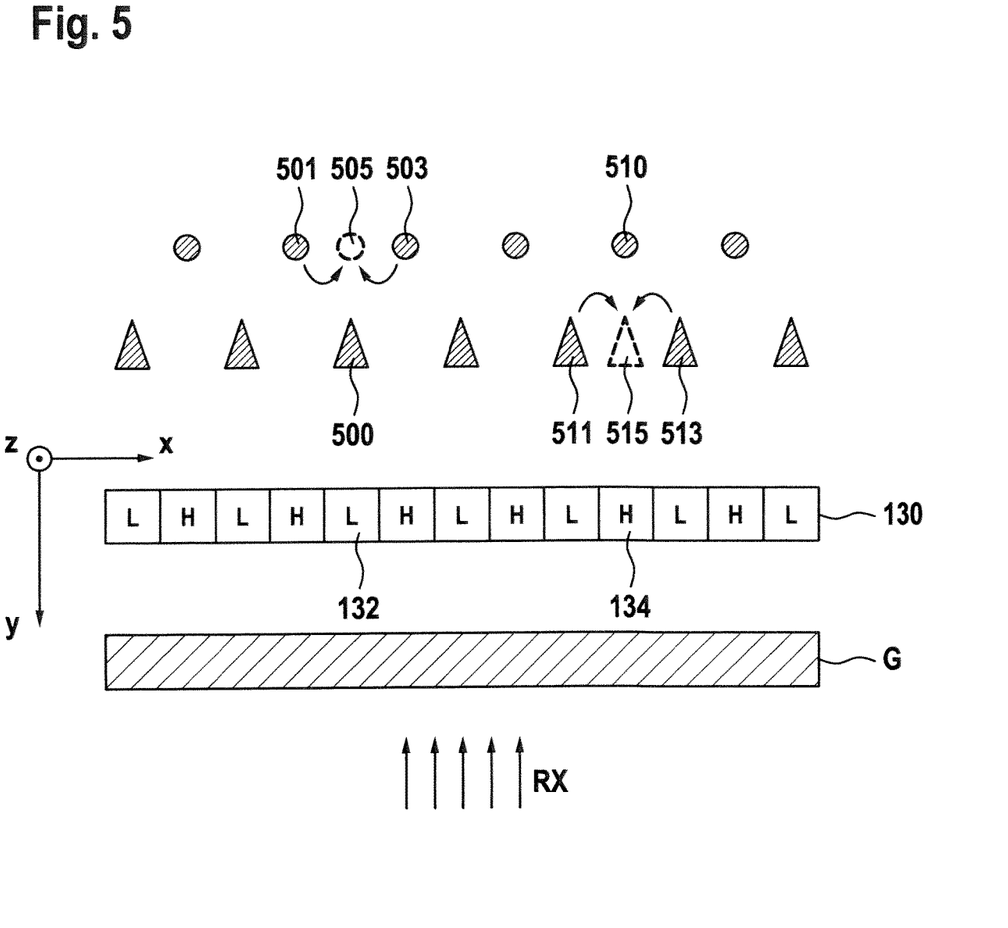
FIG. 5 illustrates the determination of missing detector data for the detector line of FIG. 2 for an object with a homogeneous material distribution.

FIG. 5 first illustrates the determination of missing detector data for the detector line 130 of FIG. 2 for an item G with a homogeneous material distribution.

According to the boundary conditions, all actually measured Lo-detector data (triangles) are equal as well as all actually measured Hi-detector data (circles) are equal. Consequently, an interpolation from the missing point adjacent actually measured detector data leads to an interpolation value which corresponds to the physical boundary conditions. The interpolation values calculated in this way for the detector data matrix 300 (FIG. 3B) are suitable for material discrimination according to the dual-energy technique and do not lead to incorrect coloring of pixels.

FIG. 5 shows two examples of reconstruction of missing detector data. In the left portion of FIG. 5, the detector element 132 as Lo-detector element has acquired Lo-detector data 500. The unmeasured Hi-detector data is calculated by interpolating the immediately adjacent measured Hi-detector data 501 and 503. This results, since the Hi-detector data 501 and 503 are of equal magnitude, in the equally large interpolation value 505. In the right region of FIG. 5, the detector element 134 as Hi-detector element has acquired Hi-detector data 510. The unmeasured Lo-detector data is calculated by interpolating the immediately adjacent measured Lo-detector data 511 and 513. Since the Lo-detector data 511 and 513 are of equal size, this results in the equally large interpolation value 515. As mentioned above, the FIG. 5 situation does not result in any false colors in the derived x-ray image, which is colored according to material classes.

Figure 6:
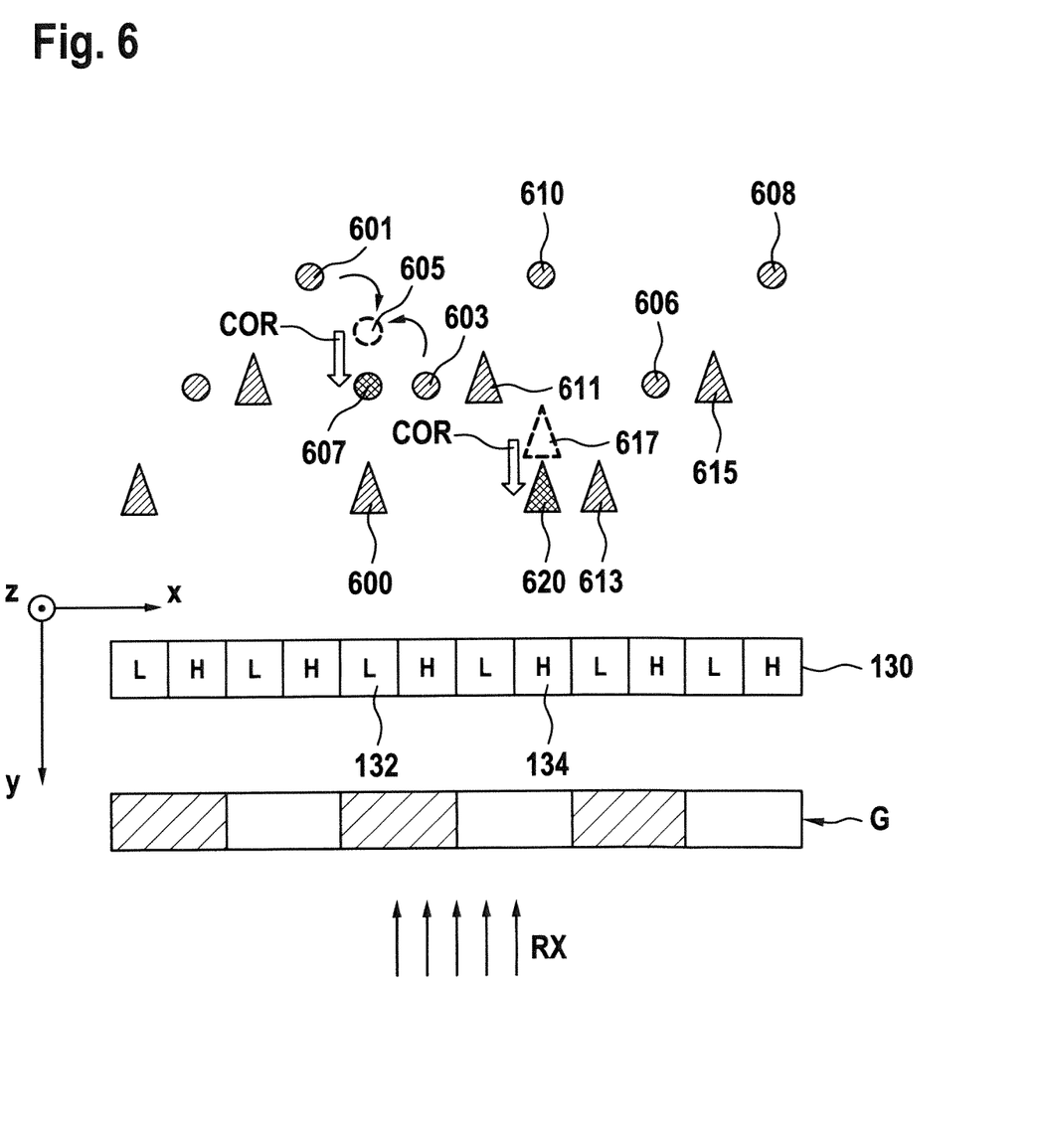
FIG. 6 illustrates interpolation errors in determining missing detector data for the detector line of FIG. 2 for an object with small-scale variations in material distribution.

FIG. 6 illustrates interpolation errors in determining missing detector data for detector line 130 of FIG. 2 for an item G with small-scale variations in material distribution.

The physical boundary conditions in FIG. 6 differ essentially in that the small-scale variations in the material properties of the inspection item mean that the interpolation of neighboring actually measured detector data cannot correctly reconstruct the missing detector data.

FIG. 6 shows an example of such an erroneous reconstruction of missing detector data. In the left portion of FIG. 6, the detector element 132 as Lo-detector element has acquired Lo-detector data 600. The unmeasured Hi-detector data is again to be calculated by interpolating the immediately adjacent measured Hi-detector data 601 and 603. Since the Hi-detector data 601 and 603 are different, this leads to an average value of the two Hi-detector data 601 and 603 adjacent to the missing Hi-detector data due to the interpolation. The interpolation value 605 obtained in this way is clearly too high. The target value 607 for a correct reconstruction is also indicated and corresponds to the detector data 603 due to the boundary conditions. The arrow COR indicates the direction in which a correction or compensation measure would have to correct the interpolation value; ideally to the value of the detector data 603.

The situation of FIG. 6 therefore leads to the generation of false colors in the derived x-ray image colored according to material classes.

As a corrective measure, it is proposed here in principle to first calculate missing detector data of one species by means of interpolation from n detector data of the same species closest in the detector line, where n is an even number greater than or equal to 2, i.e., n=2, 4, 6, . . . . This interpolation value is then corrected with a suitable correction value.

To determine the correction value, the following approach has proven to be effective. The detector data of the other type (i.e., of the complementary energy range) actually measured at the interpolation point are compared with their ambient values and, based on this, a correction of the interpolation value in the correct direction COR is performed. The more inhomogeneous and the further away from the ambient mean the values are, the larger the correction value should be.

It has proven useful to calculate the correction value as n times the actual detector data measured at the interpolation site (i.e., the complementary/other type) minus the n actual complementary detector data measured closest to the interpolation site in the detector line.

For this purpose, an example is illustrated in the right part of FIG. 6. At the location of the Hi-detector element 134, the Hi-detector data 610 has been measured. The complementary Lo-detector data missing at this location is calculated according to the strategy proposed above, for example with n=4, as follows.

First, an interpolation value 617 based on the n=4 closest measured Lo-detector data 600, 611, 613, 615 in detector line 130 is calculated. The correction value is calculated as the difference of 4 times the Hi-detector data 610 measured by the Hi-detector element 134 and the n=4 Hi-detector data 601, 603, 606, 608 closest in the detector line 130. The correction value thus obtained is used to correct the interpolation value 617 to be as close as possible to the correct Lo-detector data 620 to be reconstructed.

In effect, the interpolation measure reduces the coloration of the edges. The fine structures in the x-rayed item cause a kind of beat in the color representation, the effect of which can be reduced by the admixture of the gradient terms or difference terms of neighboring measured detector data.

Figure 7:
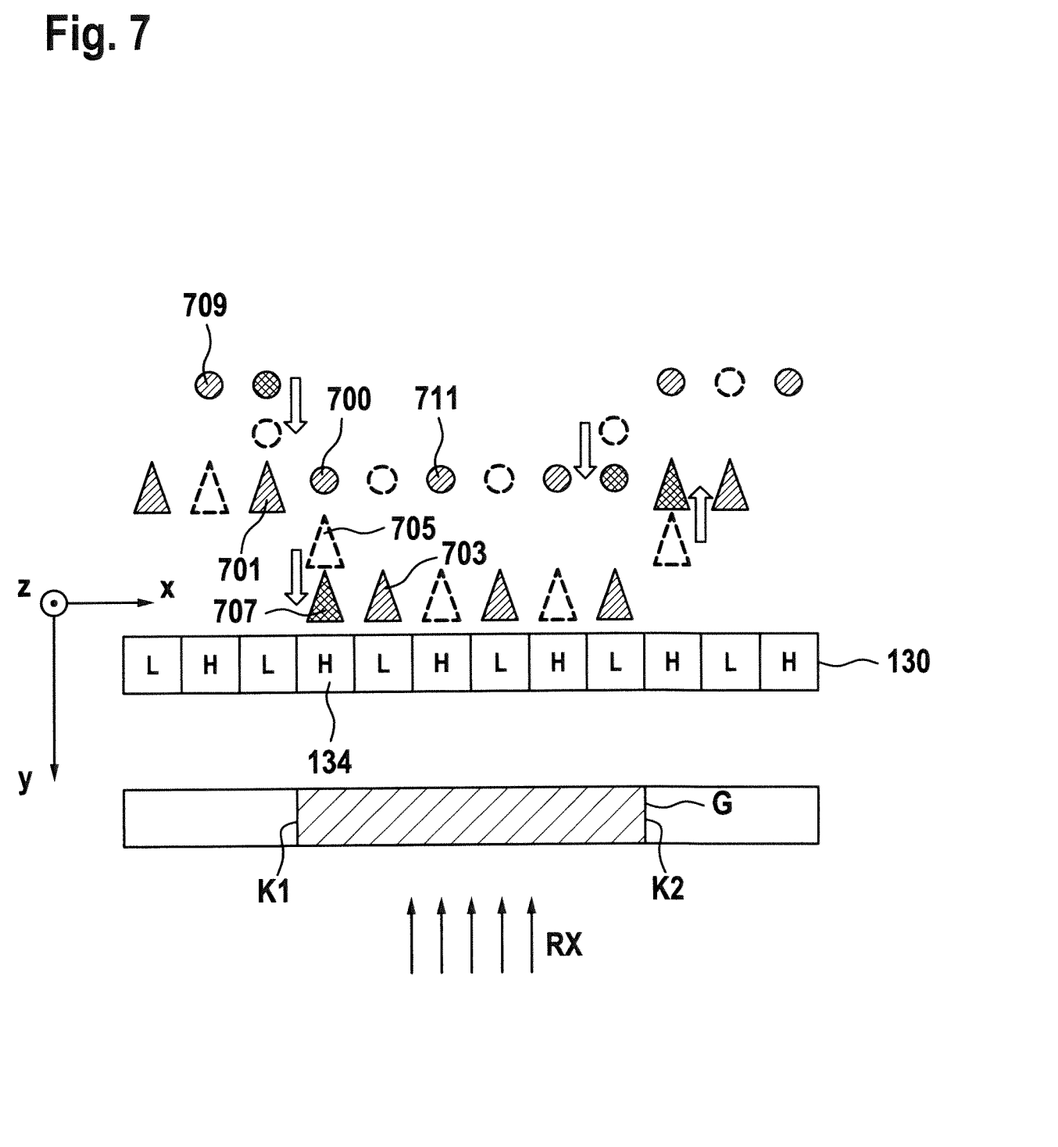
FIG. 7 illustrates interpolation errors in determining missing detector data for the detector line of FIG. 2 at the edge of an object, which represents a jump in the material distribution.

FIG. 7 illustrates interpolation errors in determining missing detector dates for detector line 130 of FIG. 2 at the edge of an object that represents a jump in material distribution.

As already shown in FIG. 6, interpolation at edges of items produces false colors in the derived x-ray image colored by material classes, since distorted detector data affects the material discrimination of the dual-energy technique.

Another correction approach that has proven successful on edges is to first determine an interpolation value at the location of interest (missing location) with a detector element of one type (Hi or Lo), initially based on n closest measured detector data of the same type in the detector line.

For example, in FIG. 7, at the location of the Hi-detector element 134 of the detector line 130, the interpolation value 705 of the missing Lo-detector data was calculated based on the n=2 nearest neighboring actually measured Lo-detector data 701, 703; n is basically supposed to be an even number greater than or equal to 2. The first calculated interpolation value 705 is not correct. As can be seen from the physical boundary conditions of FIG. 6, the interpolation value 705 is too large.

Therefore, based on empirical experiments, it is proposed here to correct the interpolation value 705 with a correction value used as a correction factor. It was found that a correction factor works well, which is defined as: Difference of 1 and the quotient of the difference of k in the detector line 130 nearest complementary actually measured Hi-detector data 709, 711 and the sum of k in the detector line 130 nearest complementary actually measured Hi-detector data 709, 711. This relatively simple calculation rule achieves very well to compensate interpolation errors at edges and thus to avoid the color distortions occurring without correction.

Figure 8:
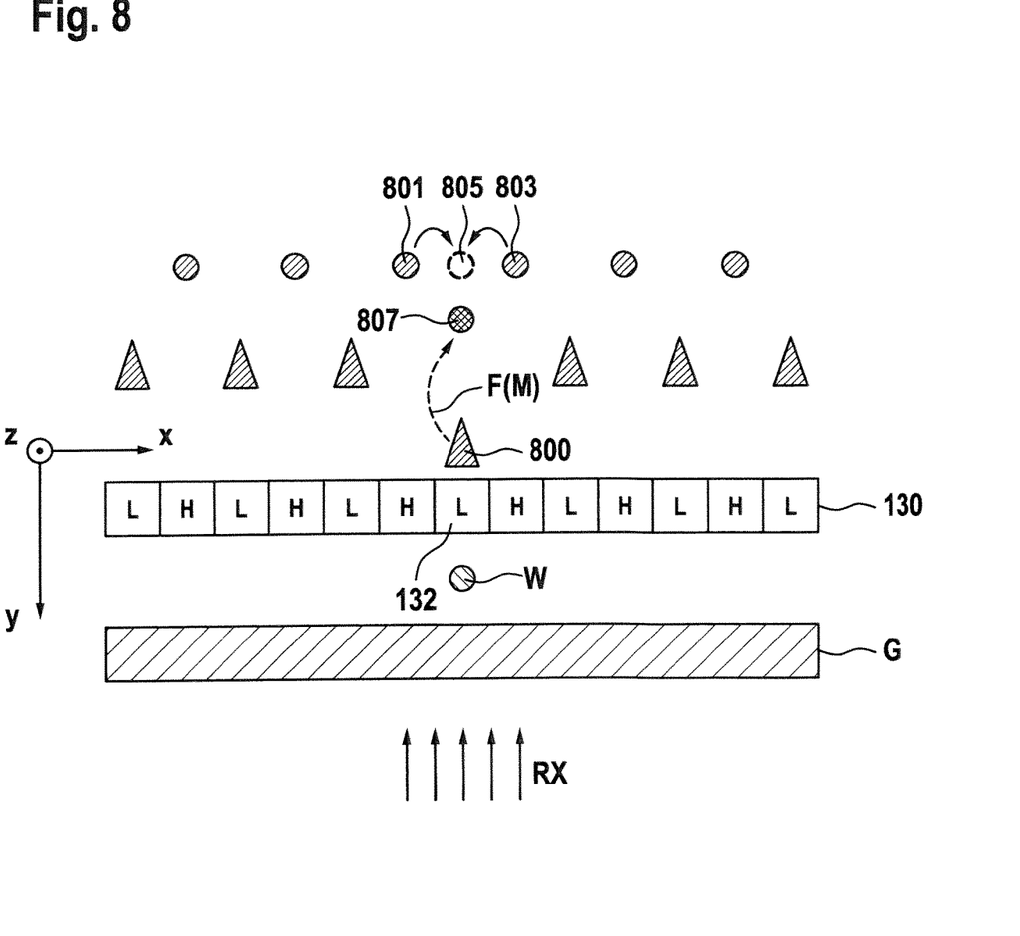
FIG. 8 illustrates a measure for luminance correction by means of which the smallest structures in the inspection object are preserved.

FIGS. 8 and 9 illustrate an additional luminance correction measure to reduce light-dark variations in the x-ray image colored by material class.

The brightness information for each pixel is usually determined based on the Hi-detector data of each pixel. This is particularly useful if the Hi-detector elements are set up to respond to the entire X-ray spectrum of the X-ray source used.

For luminance correction, the following approach has been found to be extremely effective.

First, the detector data matrix 300* of FIG. 3B is used to perform the material discrimination. For this purpose, the respective reconstructed detector data may already have been corrected with the above measures. As a result, a matrix of material data is available, which contains for each pixel a material information, for example the determined Z-effective (nuclear charge number).

Now this material data matrix is filtered with an N×N mean or median filter. The result is a filtered material data matrix.

By means of the filtered material data matrix, the theoretical associated Hi-detector data can now be calculated in the original detector data matrix 300, for all pixels for which no Hi-detector data are available, using the respectively measured Lo-detector data and the associated filtered material data based on the characteristic curve of the detector element, and a corrected brightness value can be determined accordingly. "Detector element characteristic curve" describes the absorption properties and material characteristics of the detector element.

It has been shown that this procedure effectively compensates for brightness fluctuations, but that the smallest structures, such as wires, in the inspection object are retained in the x-ray image.

FIG. 8 illustrates how, by means of the brightness correction proposed here, fine structures of an object can be preserved in the x-ray image via a clever correction of the brightness values.

In the situation of FIG. 8, a wire W lies on the homogeneous item G as a microstructure. The wire W is located at the position of the Lo-detector element 132, which acquires slightly more attenuated Lo-detector data at this position compared to the surrounding environment. The missing Hi-detector data at this location would result in inflated Hi-detector data 805 due to the homogeneous environment based on the neighboring Hi detector data 801, 803.

Since the brightness of a pixel in the x-ray image is basically determined by the Hi-detector data, the wire W would be filtered out in the worst case. With the measure presented above, the Hi-detector data 807 are determined for the brightness control on the basis of the actually measured Lo-detector data and the material value (Z-effective) determined for this pixel via the characteristic curve of the detector element. Compared to the other measures proposed to improve material discrimination, this leads to a better resolution of smallest structures in the x-ray image just by the luminance correction or luminance control (brightness control) performed thereby.

It should be noted that material discrimination and brightness control are independent of each other and can all be applied together. No particular order is preferred.

All the methods presented here work sufficiently well over the entire detector line, basically to the edge at a distance equal to the number of detector elements required for correction. At the line edges, however, the tunnel of the X-ray inspection system also physically comes to an end.

Thus, the edge area of the detector line is uninteresting or unimportant for the observation.

What is claimed is:

1. A method for correcting detector data provided by an inspection apparatus that includes a dual-energy X-ray detector, wherein the dual-energy X-ray detector includes a detector line arranged transversely to a sampling direction, the detector line including first detector elements and second detector elements which are differently responsive to an X-ray spectrum, which are arranged alternately adjacent to each other in the detector line, wherein the first and second detector elements detect X-ray radiation independently of each other and the first detector elements generate corresponding first detector data and the second detector elements generate second detector data, and wherein the inspection apparatus is arranged for transporting in the sampling direction inspection objects through the inspection apparatus for performing an imaging inspection for non-destructive inspection of the inspection objects and for providing detector data describing the inspection objects based on detection of X-rays X-raying the inspection objects with the dual-energy X-ray detector, the method comprising:
   (a1) deriving missing second detector data for a location of a first detector element of the first detector elements by:
      determining an interpolation value of measured second detector data from second detector elements adjacent to said first detector element;
      determining a correction value based on first detector data measured with said first detector element and adjacent measured first detector data; and
      correcting the interpolation value with the correction value;
   and/or
   (a2) deriving missing first detector data for a location of a second detector element of the second detector elements by:
      determining an interpolation value of measured first detector data from first detector elements adjacent to said second detector element;
      determining a correction value based on second detector data measured with said second detector element and adjacent measured second detector data; and
      correcting the interpolation value with the correction value; and
   wherein the method further comprises correcting an assigned brightness value determined based on determined detector data of a pixel by:
      (b1) determining material values for all pixels based on actual detector data measured for each pixel and the detector data determined for each pixel, wherein the material values associated with the pixels define a material information matrix by storing a Z-effective value as a material value in the material information matrix for each pixel corresponding to a detector element;
      (b2) filtering the material values determined for all pixels in the material information matrix by means of a mean-based or median-based filter operation which detects N×N material values around each pixel, where N is an integer greater than 3, preferably N=5;
      (b3) determining, at each pixel where first detector data has been measured, theoretical second detector data associated with that pixel based on the material value determined for that pixel; and
      (b4) determining for all pixels a respective brightness value based on the measured second detector data or the theoretical second detector data available for the respective pixel.

2. The method of claim 1, wherein the first detector elements and second detector elements each include a photodiode each provided with a scintillator material selected to adjust sensitivity to X-rays of the X-ray spectrum and dimensioned in a thickness to be X-rayed by the X-rays.

3. The method of claim 1, where
   the first detector elements and the second detector elements are on the same side of a substrate, or
   the first detector elements are on one side of the substrate and the second detector elements are on the other side of the substrate.

4. The method according to claim 1, wherein
   determining the correction value in step (a1) comprises taking a difference of n times the detector data measured with the first detector element and a sum of n first detector data measured adjacent in the detector line; and/or
   determining the correction value in step (a2) comprises taking the difference of n times the detector data measured with the second detector element and the sum of n second detector data measured adjacent in the detector line;
   where n is an integer, even number with n>=2.

5. The method according to claim 1, wherein the correction value is a correction factor and correcting the interpolation value with the correction value comprises multiplying the interpolation value by the correction factor; and wherein
   determining the correction factor in step (a1) comprises taking the difference of 1 and a quotient of a difference of the two second detector data measured in the detector line adjacent to the left and right sides and the sum of the two second detector data measured in the detector line adjacent to the left and right sides; or
   determining the correction factor in step (a2) comprises forming the difference of 1 and a quotient of a difference of the two first detector data measured in the detector line adjacent to the left side and adjacent to the right side and the sum of the two first detector data measured in the detector line adjacent to the left side and adjacent to the right side.

6. A processing device for correcting detector data, the processing device arranged to perform a method according to claim 1.

7. A computer program product comprising a computer program having software means for performing a method according to claim 1, when the computer program is executed on a computer, in particular on a processing device.

8. A data carrier with the computer program product according to claim 7.

9. A data stream comprising electronically readable control signals capable of interacting with a programmable computer such that when the computer executes the electronically readable control signals, the computer performs a method according to claim 1.

10. A method for correcting detector data provided by an inspection apparatus that includes a dual-energy X-ray detector, wherein the dual-energy X-ray detector includes a detector line arranged transversely to a sampling direction, the detector line including first detector elements and second detector elements which are differently responsive to an X-ray spectrum, which are arranged alternately adjacent to each other in the detector line, wherein the first and second detector elements detect X-ray radiation independently of each other and the first detector elements generate corresponding first detector data and the second detector elements generate second detector data, and wherein the inspection apparatus is arranged for transporting in the sampling direction inspection objects through the inspection apparatus for performing an imaging inspection for non-destructive inspection of the inspection objects and for providing detector data describing the inspection objects based on detection of X-rays X-raying the inspection objects with the dual-energy X-ray detector, the method comprising:

(a1) deriving missing second detector data for a location of a first detector element of the first detector elements by:
determining an interpolation value of measured second detector data from second detector elements adjacent to said first detector element;
determining a correction value based on first detector data measured with said first detector element and adjacent measured first detector data; and
correcting the interpolation value with the correction value;

and/or (a2) deriving missing first detector data for a location of a second detector element of the second detector elements by:
determining an interpolation value of measured first detector data from first detector elements adjacent to said second detector element;
determining a correction value based on second detector data measured with said second detector element and adjacent measured second detector data; and
correcting the interpolation value with the correction value; and wherein
determining the correction value in step (a1) comprises taking a difference of n times the detector data measured with the first detector element and a sum of n first detector data measured adjacent in the detector line; and/or
determining the correction value in step (a2) comprises taking the difference of n times the detector data measured with the second detector element and the sum of n second detector data measured adjacent in the detector line;
where n is an integer, even number with n>=2.

11. A method for correcting detector data provided by an inspection apparatus that includes a dual-energy X-ray detector, wherein the dual-energy X-ray detector includes a detector line arranged transversely to a sampling direction, the detector line including first detector elements and second detector elements which are differently responsive to an X-ray spectrum, which are arranged alternately adjacent to each other in the detector line, wherein the first and second detector elements detect X-ray radiation independently of each other and the first detector elements generate corresponding first detector data and the second detector elements generate second detector data, and wherein the inspection apparatus is arranged for transporting in the sampling direction inspection objects through the inspection apparatus for performing an imaging inspection for non-destructive inspection of the inspection objects and for providing detector data describing the inspection objects based on detection of X-rays X-raying the inspection objects with the dual-energy X-ray detector, the method comprising:

(a1) deriving missing second detector data for a location of a first detector element of the first detector elements by:
determining an interpolation value of measured second detector data from second detector elements adjacent to said first detector element;
determining a correction value based on first detector data measured with said first detector element and adjacent measured first detector data; and
correcting the interpolation value with the correction value;

and/or (a2) deriving missing first detector data for a location of a second detector element of the second detector elements by:
determining an interpolation value of measured first detector data from first detector elements adjacent to said second detector element;
determining a correction value based on second detector data measured with said second detector element and adjacent measured second detector data; and
correcting the interpolation value with the correction value; and wherein the correction value is a correction factor and correcting the interpolation value with the correction value comprises multiplying the interpolation value by the correction factor; and wherein
determining the correction factor in step (a1) comprises taking the difference of 1 and a quotient of a difference of the two second detector data measured in the detector line adjacent to the left and right sides and the sum of the two second detector data measured in the detector line adjacent to the left and right sides; or
determining the correction factor in step (a2) comprises forming the difference of 1 and a quotient of a difference of the two first detector data measured in the detector line adjacent to the left side and adjacent to the right side and the sum of the two first detector data measured in the detector line adjacent to the left side and adjacent to the right side.

* * * * *